(12) United States Patent  (10) Patent No.: US 8,151,843 B2
Ishii et al.  (45) Date of Patent: Apr. 10, 2012

(54) PNEUMATIC TIRE WITH SPECIFIED OUTER CARCASS PERIPHERY LENGTH AND OUTER GROUND-CONTACT AREA

(75) Inventors: Shigemasa Ishii, Funabashi (JP); Nobuaki Toyosato, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 820 days.

(21) Appl. No.: 11/662,472

(22) PCT Filed: Aug. 29, 2005

(86) PCT No.: PCT/JP2005/015612
§ 371 (c)(1),
(2), (4) Date: Oct. 5, 2007

(87) PCT Pub. No.: WO2006/030619
PCT Pub. Date: Mar. 23, 2006

(65) Prior Publication Data
US 2008/0149239 A1 Jun. 26, 2008

(30) Foreign Application Priority Data
Sep. 13, 2004 (JP) .................. P2004-265960

(51) Int. Cl.
*B60C 3/06* (2006.01)
*B60C 9/17* (2006.01)
*B60C 11/03* (2006.01)

(52) U.S. Cl. ............. 152/209.8; 152/455; 152/456
(58) Field of Classification Search ............ 152/209.8, 152/209.9, 455, 456
See application file for complete search history.

(56) References Cited

U.S. PATENT DOCUMENTS

| 4,905,748 A * | 3/1990 | Kukimoto et al. ........ 152/456 X |
| 7,278,455 B2 * | 10/2007 | Hedo et al. ................. 152/209.8 |
| 2006/0266455 A1 * | 11/2006 | Nagai ........................ 152/209.8 |

FOREIGN PATENT DOCUMENTS

| EP | 0 298 071 A1 * | 1/1989 |
| EP | 0 370 699 A2 * | 5/1990 |
| JP | 57-147901 A | 9/1982 |

(Continued)

OTHER PUBLICATIONS

Chinese Office Action dated Sep. 18, 2009 with translation (10 pages).

*Primary Examiner* — Adrienne C. Johnstone
(74) *Attorney, Agent, or Firm* — Sughrue Mion, PLLC

(57) ABSTRACT

A pneumatic tire 1 according to the invention has bead portions 11, 12 including bead cores 11a, 12a, and at least a carcass layer 13 and a tread portion 16 arranged, wherein in a section in a tire-width direction, assuming as a reference a tire centerline CL making right angles with a bead line BL interconnecting a center of the bead core 11a and a center of the bead core 12a, and passing a center of the bead line BL, an outer ground-contact area 20B is wider by 5 to 15% than an inner ground-contact area 20B, and wherein in the section in the tire-width direction, a carcass periphery length as a distance along a carcass centerline CaL from a crossing point P to an approach point P2 is longer by 0.5 mm to 10 mm than a carcass periphery length Ca as a distance from the crossing point P to an approach point P1.

3 Claims, 2 Drawing Sheets

FOREIGN PATENT DOCUMENTS

| | | | |
|---|---|---|---|
| JP | 63-8003 A | | 1/1988 |
| JP | 04271902 A | * | 9/1992 |
| JP | 6-92104 A | | 4/1994 |
| JP | 7-223407 A | | 8/1995 |
| JP | 8-164715 A | | 6/1996 |
| JP | 9-300906 A | | 11/1997 |
| JP | 2002192905 A | * | 7/2002 |
| JP | 2003-170702 A | | 6/2003 |
| WO | WO-01/34412 A2 | * | 5/2001 |
| WO | WO-2004/052663 A1 | * | 6/2004 |

* cited by examiner

PNEUMATIC TIRE WITH SPECIFIED OUTER CARCASS PERIPHERY LENGTH AND OUTER GROUND-CONTACT AREA

TECHNICAL FIELD

The present invention relates to a pneumatic tire with an enhanced traveling performance, in particular of lane changeability as well as of cornering performance, with a suppression of lopsided abrasion.

BACKGROUND ART

Recent years have observed, along with enhanced performances of vehicles, strong demands for enhancement in traveling performances of pneumatic tires, such as a straight-going performance as an ability to go straight, a lane changeability as an ability to move from an ongoing lane to another lane, and a cornering performance as an ability to turn.

To respond to such demands, various proposals have been made. For example, a pneumatic tire has been disclosed (Japanese Patent Application Laying-Open Publication No. Sho57-147901), which has in a section in a tire-width direction a gap in radius of curvature between an inner side when vehicle-mounted and an outer side when vehicle-mounted.

The above-noted pneumatic tire has an enhanced traveling performance. However, due to the gap in radius of curvature between inner side when vehicle-mounted and outer side when vehicle-mounted, it has different road surface contact pressures between the inner side when vehicle-mounted and the outer side when vehicle-mounted. Therefore, with resultant occurrences of lopsided wear, the tire life has been shortened, as a problem.

The present invention is made in view of such points. It therefore is an object of the invention to provide a pneumatic tire with an enhanced traveling performance, in particular of lane changeability as well as of cornering performance, allowing for a suppression of lopsided abrasion.

DISCLOSURE OF INVENTION

According to a first aspect of the invention, a pneumatic tire (pneumatic tire 1) comprises bead portions (bead portions 11, 12) including an inner bead core (bead core 11a) located on an inner side when vehicle-mounted and an outer bead core (bead core 12a) located on an outer side when vehicle-mounted, and at least a cacass layer (carcass layer 13) and a tread portion (tread portion 16) disposed in a direction from a tire-radially inner side to a tire-radially outer side, wherein in a section in a tire-width direction, assuming as a reference a tire centerline (tire centerline CL) making right angles with a bead line (bead line BL) interconnecting a center (C1) of the inner bead core and a center (C2) of the outer bead core, and passing a center (T) of the bead line, an outer ground-contact area (outer ground-contact area 20B) as a ground contact area between a road surface and the tread portion to be outside when vehicle-mounted is wider by 5 to 15% than an inner ground-contact area (inner ground-contact area 20A) as a ground contact area between a road surface and the tread portion to be inside when vehicle-mounted, and wherein in the section in the tire-width direction, an outer carcass periphery length (outer carcass periphery length Ca1) as a distance along a carcass centerline (carcass centerline CaL) passing a center of the carcass layer, from a crossing point (P) where the carcass centerline and the tire centerline cross, to a point (P2) where an inner end of the outer bead core is approached closest, is longer by 0.5 mm to 10 mm than an inner carcass periphery length (inner carcass periphery length Ca) as a distance along the carcass centerline from the crossing point to a point (P1) where an inner end of the inner bead core is approached closest According to this aspect, with the outer carcass periphery length set longer by 0.5 mm to 10 mm than the inner carcass periphery length, a conicity is generated, allowing smooth development of cornering forces upon a lane change as well as upon a cornering. This results in enhanced lane changeability and cornering performance of pneumatic tire. Further, for pneumatic tires mounted to both left and right wheels, conicities develop in opposite directions at left and right of the vehicle, effecting a mutual cancellation of the conicities, thus allowing for an ensured straight-going performance.

It is noted that if the outer carcass periphery length is identical to the inner carcass periphery length, or in excess under +0.5 mm, the conicity then developed is small, so that the lane changeability and cornering performance of the pneumatic tire will not be enhanced.

If the outer carcass periphery length is in excess over +10 mm in comparison with the inner carcass periphery length, the conicity gets excessively large, so that at the outer side when vehicle-mounted, a one-sided wear progresses fast.

Further, with the outer ground-contact area set wider by 5 to 15% than the inner ground-contact area, the road surface contact pressure between a road surface and the tread portion to be outside when vehicle-mounted is dispersed, so that the outer carcass periphery length set longer than the inner carcass periphery length allows for a suppression of one-sided wear that might have developed at the outside when vehicle-mounted.

It is noted that in the case of an outer ground-contact area under 5% in difference in comparison with the inner ground-contact area, the road surface contact pressure between a road surface and the tread portion to be outside when vehicle-mounted may undergo a failed dispersion, so that the one-sided wear may progress fast at the outside when vehicle-mounted.

Further, in the case of an outer ground-contact area in excess of 15% in comparison with the inner ground-contact area, the road surface contact pressure between a road surface and the tread portion to be inside when vehicle-mounted may be increased, with a resultant excessive load imposed on the inside when vehicle-mounted, so that the wear may progress fast at the inside when vehicle-mounted.

According to a second aspect of the invention, a plurality of blocks are formed by a plurality of grooves in a tread face of the tread portion, and an outer negative ratio as a proportion of area of grooves to the tread face of the tread portion at the outer side when vehicle-mounted relative to the tire centerline is lower by 5 to 15% than an inner negative ratio as a proportion of area of grooves to the tread face of the tread portion at the inner side when vehicle-mounted relative to the tire centerline.

According to this aspect, the outer negative ratio being lower by 5 to 15% than the inner negative ratio allows the provision of a variety of patterns in consideration of tire characteristics, allowing for enhancement of, for example, a drainage performance, a dry performance, and a wet performance.

It is noted that in the case of an outer negative ratio under 5% in comparison with the inner negative ratio, the wet performance on a wet road surface may fail in enhancement, and the lane changeability and cornering performance on a wet road surface may fail in enhancement Further, in the case of an outer negative ratio in excess of 15% in comparison with the inner negative ratio, the road surface contact pressure between a road surface and the tread portion may be different between the inside when vehicle-mounted and the outside when vehicle-mounted relative to the tire centerline, so that the suppression of lopsided abrasion may be failed.

According to a third aspect of the invention, a belt layer (belt layer 14) provided in a tire-radial direction of the carcass layer is further comprised, and in the section in the tire width-direction, the outer carcass periphery length has in comparison with the inner carcass periphery length an elongate part located at an inner side in the tire-radial direction of the belt layer.

According to a fourth aspect of the invention, a side wall portion provided on an outer side in the tire-width direction of the carcass layer is further comprised, and in the section in the tire width-direction, the outer carcass periphery length has in comparison with the inner carcass periphery length an elongate part located at an inner side in the tire-width direction of the side wall portion.

BEST MODE FOR CARRYING OUT THE INVENTION

Figure 1:
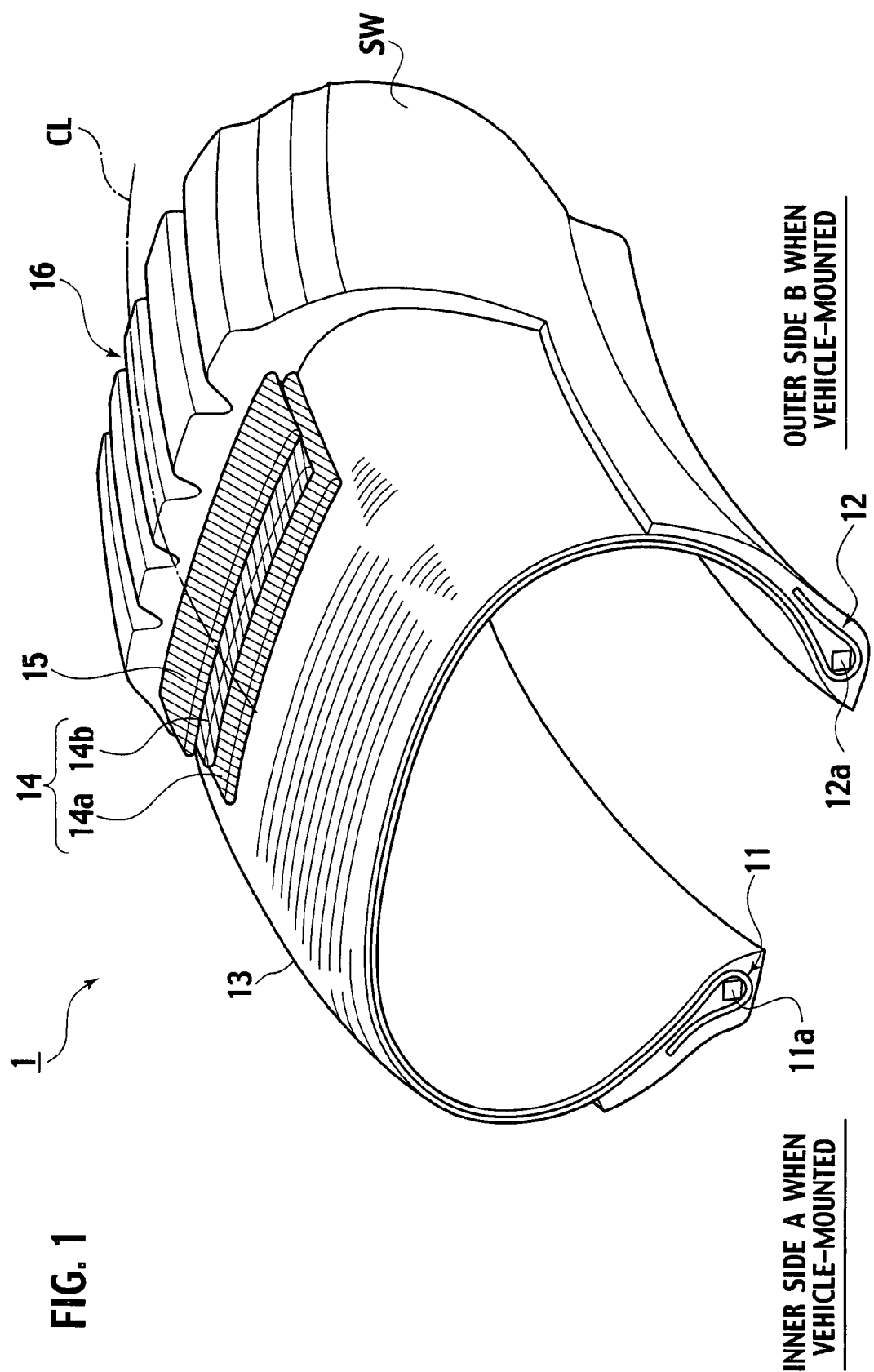
FIG. 1 is a perspective view, exploded in part, of a pneumatic tire according to the present mode of embodiment.

There will be described below an example of a pneumatic tire 1 according to the present invention, with reference to the drawings. It is noted that in the drawings, like or similar parts are designated by like or similar reference characters. It however is noted that the drawings are schematic, and proportions of dimensions or the like may be different from practices. Particular dimensions and the like should be judged in consideration of the following description. Mutual relationships and proportions of dimension may be different in part between drawings, as a matter of course.

(Configuration of Pneumatic Tire)

FIG. 1 is a perspective view, exploded in part, of a pneumatic tire according to the present mode of embodiment. As shown in FIG. 1, the pneumatic tire 1 has bead portions 11, 12 including a bead core 11a located at an inner side A when vehicle-mounted (inner bead core), and a bead core 12a located at an outer side B when vehicle-mounted (outer bead core). Specifically, aramid fiber cords (Kevlar, etc.) as well as steel cords or the like are employed for the bead core 11a, 12a constituting the bead portion 11, 12.

The pneumatic tire 1 has a carcass layer 13 that constitutes a frame of the pneumatic tire 1. Tire-radially outside the cacass layer 13 is disposed a belt layer 14 (a first belt layer 14a and a second belt layer 14b). Further, tire-radially outside the carcass layer 13 is disposed a side wall portion SW.

Tire-radially outside the belt layer 14 is disposed a belt protecting layer 15. Tire-radially outside the belt protecting layer 15 is disposed a tread portion 16 that contacts a road surface.

Figure 2:
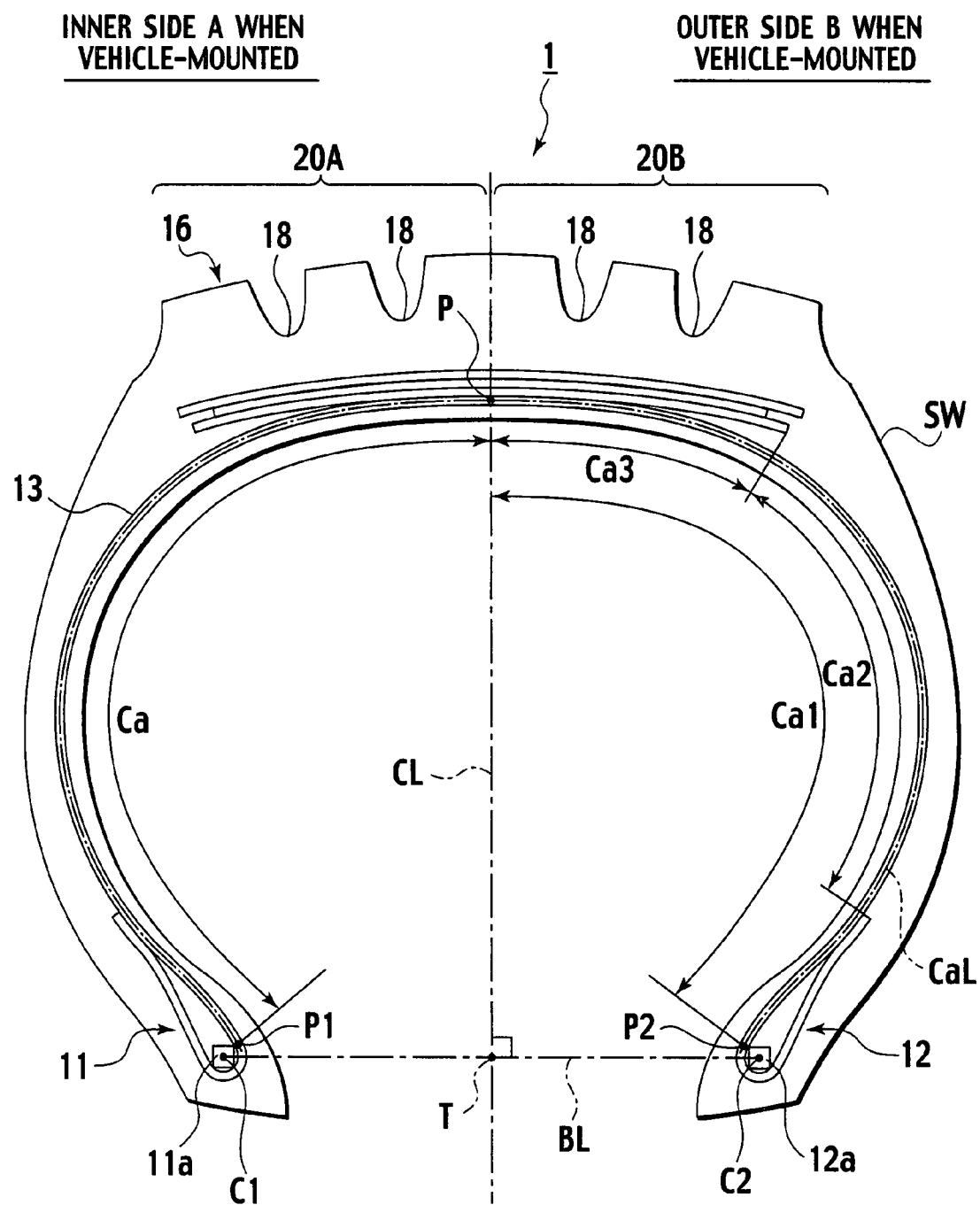
FIG. 2 is a section in a width direction of the pneumatic tire according to the present mode of embodiment

Description is now made of a carcass periphery length of the pneumatic tire 1 according to this mode of embodiment, with reference to FIG. 2. It is assumed that in the following, an outer ground-contact area 20B, as a ground-contacting area between road surface (not shown) and tread portion 16, relative to a tire centerline CL as a reference, is set wider by 10% than an inner ground-contact area 20A, as a ground-contacting area between road surface and tread portion 16, relative to the tire centerline CL as a reference.

Here, the tire centerline CL is a line that makes right angles with a bead line BL interconnecting a center C1 of the bead core 11a and a center C2 of the bead core 12a, and passes a center T of the bead line BL.

The carcass periphery length is a distance along a carcass centerline CaL passing a center of the carcass layer 13, from a crossing point P where the carcass centerline CaL and the tire centerline CL cross, to a point P1 or P2 where an inner end of the bead core 11a or 12a is approached closest.

A carcass periphery length Ca1 at the outer side B when vehicle-mounted (outer carcass periphery length) is set longer by 3 mm than a carcass periphery length at the inner side A when vehicle-mounted (inner carcass periphery length Ca).

Although in this mode of embodiment the carcass periphery length Ca1 at the outer side B when vehicle-mounted is set longer by 3 mm than the carcass periphery length Ca at the inner side A when vehicle-mounted, as described, this is not a limitation, and it may well be set longer by 0.5 to 10 mm than the carcass periphery length Ca at the inner side A when vehicle-mounted.

Further, although in this mode of embodiment the carcass periphery length Ca1 at the outer side B when vehicle-mounted is described to be longer than the carcass periphery length Ca at the inner side A when vehicle-mounted, this may not be a simple limitation.

For example, the outer carcass periphery length may have, in comparison with the inner carcass periphery length Ca, an elongate part located at an inner side in the tire-width direction of the side wall portion SW. That is, a carcass periphery length Ca2 at the outer side B when vehicle-mounted may be longer than the carcass periphery length Ca at the inner side A when vehicle-mounted. The elongate part is measured from a line perpendicular to the carcass centerline CaL and tangent to the axially outer edge of the radially innermost belt layer 14a to a line perpendicular to the carcass centerline CaL and tangent to the edge of a turnup portion of the carcass layer 13 turned up from axially inside to axially outside around the outer bead core 12a.

Further, the outer carcass periphery length may have, in comparison with the inner carcass periphery length Ca, an elongate part located at an inner side in the tire-radial direction of the belt layer 14 (first belt layer 14a). That is, a carcass periphery length Ca3 at the outer side B when vehicle-mounted may be longer than the carcass periphery length Ca at the inner side A when vehicle-mounted. The elongate part is measured from the crossing point where the carcass centerline CaL and the tire centerline CL cross to the line perpendicular to the carcass centerline CaL and tangent to the axially outer edge of the radially innermost belt layer 14a.

Further, in this mode of embodiment, an outer negative ratio as a proportion of area of grooves 18 to tread face 17 of the tread portion at the outer side B when vehicle-mounted, relative to the tire centerline CL, is lower by 5 to 15% than an inner negative ratio as a proportion of area of grooves 18 to tread face 17 of the tread portion at the inner side B when vehicle-mounted, relative to the tire centerline CL.

(Function and Effects)

According to the mode of embodiment described, in the pneumatic tire 1, which has the outer carcass periphery length Ca1 set longer by 0.5 mm to 10 mm than the inner carcass periphery length Ca, a conicity is generated, allowing smooth development of cornering forces upon a lane change as well as upon a cornering. This results in enhanced lane change-ability and cornering performance of the pneumatic tire 1. Further, for pneumatic tires mounted to both left and right wheels, conicities develop in opposite directions at left and right of the vehicle, effecting a mutual cancellation of the conicities, thus allowing for an ensured straight-going performance.

Further, with the outer ground-contact area 20B set wider by 5 to 15% than the inner ground-contact area 20A, the road surface contact pressure between road surface and tread portion 16 to be outside B when vehicle-mounted is dispersed, so that the outer carcass periphery length Ca1 set longer than the inner carcass periphery length Ca allows for a suppression of one-sided wear that might have developed at the outside B when vehicle-mounted.

Further, the outer negative ratio being lower by 5 to 15% than the inner negative ratio allows the provision of a variety of patterns in consideration of tire characteristics, allowing for enhancement of, for example, a drainage performance, a dry performance, and a wet performance.

(Comparison and Evaluation)

Description is now made of results of tests which employed pneumatic tires according to examples of embodiment of the invention, and to comparative examples, for clarification of effects of the invention.

The pneumatic tires according to respective embodiment examples and comparative examples were each respectively "205/60R15" in size. That is, approx. 205 mm in width of section (tread width), approx. 60% in tire profile (ratio of tire height in section to tire width), and 15 inches in rim diameter.

The pneumatic tires according to the embodiment examples and comparative examples had a carcass layer of two 110Tex polyester cords, a belt layer of two steel cord layers, and a belt protection layer of a single layer of 140 Tex nylon cord to the belt layer. Other materials used were all identical.

First, description is made of test results due to differences between inner ground-contact area and outer ground-contact area, with reference made to Table 1.

[Table 1]

<Lane Changeability Test>

Pneumatic tires according to comparative examples and embodiment examples were mounted to test cars (FF: 2,362cc), which moved in a straight section of a test track, from a constant speed travel of 140 km/h to the next lane (for 1 lane movement), when a professional driver evaluated the response (so-called steer feeling) and settlement (so-called settle feeling in the moved lane), etc. It is noted that for the lane changeability, the evaluation score was sensory-rated on a scale of one to ten. The higher the evaluation score is, the better the lane changeability.

As shown in Table 1, it turned out that pneumatic tires according to embodiment examples 1-1 to 1-3 were excellent in lane changeability in comparison with pneumatic tires according to comparative examples 1-1 and 1-2.

<Tire Life Test>

Pneumatic tires according to comparative examples and embodiment examples were driven to roll 2,000 km by a drum installed in a room, dropping fine grains of sand between the drum and the tread portion, before estimation of a tire life as a time point where a remaining groove (such as a circumferential principal groove or rag groove) becomes 1.6 mm.

As shown in Table 1, it turned out that pneumatic tires according to embodiment examples 1-1 to 1-3 had a longer tire life, in comparison with pneumatic tires according to comparative examples 1-1 and 1-2. That is, it turned out that the pneumatic tires according to embodiment examples 1-1 to 1-3 were excellent in abrasion resistance.

<Combined Results>

◉ denotes a case in which the lane changeability and the tire life described above were both excellent. ○ denotes a case in which the travel distance had exceeded 20,000 km till the end of tire life was reached, while the lane changeability was excellent. Further, × denotes a case in which the travel distance had not exceeded 20,000 km till the end of tire life was reached, while the lane changeability was excellent As a result, it turned out that pneumatic tires according to embodiment examples 1-1 to 1-3, in which the outer ground-contact area was wider by 5 to 15% than the inner ground-contact area, had an enhanced lane changeability, and long tire life (with a suppressed degradation of abrasion resis-

TABLE 1

|  | COMPARATIVE EXAMPLE 1-1 | EMBODIMENT EXAMPLE 1-1 | EMBODIMENT EXAMPLE 1-2 | EMBODIMENT EXAMPLE 1-3 | COMPARATIVE EXAMPLE 1-2 |
|---|---|---|---|---|---|
| INNER/OUTER PERIPHRY LENGTH DIFFERENCE (mm) | 3 | 3 | 3 | 3 | 3 |
| PROPORTION OF OUTER GROUND-CONTACT AREA TO INNER GROUND-CONTACT AREA (%) | 4 | 5 | 10 | 15 | 16 |
| LANE CHANGEABILITY | 5.5 | 5.5 | 6 | 5.5 | 5.5 |
| TIRE LIFE (km) | 19500 | 21000 | 24800 | 20400 | 19200 |
| COMBINED RESULTS | X | ○ | ◉ | ○ | X | tance). In particular, it turned out that a pneumatic tire according to embodiment example 1-2, in which the outer ground-contact area was wider by 10% than the inner ground-contact area, had an enhanced lane changeability, and long tire life.

Description is now made of test results due to differences of gap for an outer carcass periphery length Ca1 being greater than an inner carcass periphery length Ca1, with reference made to Table 2.

[Table 2]

TABLE 2

|  | COMPARATIVE EXAMPLE 2-1 | EMBODIMENT EXAMPLE 2-1 | EMBODIMENT EXAMPLE 2-2 | EMBODIMENT EXAMPLE 2-3 | EMBODIMENT EXAMPLE 2-4 | EMBODIMENT EXAMPLE 2-5 | COMPARATIVE EXAMPLE 2-2 |
|---|---|---|---|---|---|---|---|
| INNER/OUTER PERIPHRY LENGTH DIFFERENCE (mm) | 0.4 | 0.5 | 1 | 2 | 3 | 10 | 11 |

TABLE 2-continued

| | COMPARATIVE EXAMPLE 2-1 | EMBODIMENT EXAMPLE 2-1 | EMBODIMENT EXAMPLE 2-2 | EMBODIMENT EXAMPLE 2-3 | EMBODIMENT EXAMPLE 2-4 | EMBODIMENT EXAMPLE 2-5 | COMPARATIVE EXAMPLE 2-2 |
|---|---|---|---|---|---|---|---|
| PROPORTION OF OUTER GROUND-CONTACT AREA TO INNER GROUND-CONTACT AREA (%) | 10 | 10 | 10 | 10 | 10 | 10 | 10 |
| LANE CHANGEABILITY | 4.5 | 5 | 5.0+ | 5.5 | 6 | 6 | 5 |
| TIRE LIFE (km) | 19800 | 20500 | 22000 | 23500 | 24800 | 20050 | 19050 |
| COMBINED RESULTS | X | ○ | ○ | ○ | ◎ | ○ | X |

<Lane Changeability Test>

Pneumatic tires according to comparative examples and embodiment examples were mounted to test cars (FF: 2,362cc), which moved in a straight section of a test track from a constant speed travel of 140 km/h to the next lane (for 1 lane movement), when a professional driver evaluated the response (so-called steer feeling) and settlement (so-called settle feeling in the moved lane), etc. It is noted that the greater the value is, the better the lane changeability.

As shown in Table 2, it turned out that pneumatic tires according to embodiment examples 2-1 to 2-5 and comparative example 2-2 were excellent in lane changeability in comparison with a pneumatic tire according to comparative example 2-1.

<Tire Life Test>

Pneumatic tires according to comparative examples and embodiment examples were driven to roll 2,000 km by a drum installed in a room, dropping fine grains of sand between the drum and the tread portion, before estimation of a tire life as a time point where a remaining groove (such as a circumferential principal groove or rag groove) becomes 1.6 mm.

As shown in Table 1, it turned out that pneumatic tires according to embodiment examples 2-1 to 2-5 had a longer tire life (was able to travel over 20,000 km), in comparison with pneumatic tires according to comparative examples 2-1 and 2-2. That is, it turned out that the pneumatic tires according to embodiment examples 2-1 to 2-5 were excellent in abrasion resistance.

<Combined Results>

◎ denotes a case in which the lane changeability and the tire life described above were both excellent ○ denotes a case in which the travel distance had exceeded 20,000 km till the end of tire life was reached, while the lane changeability was excellent Further, × denotes a case in which the travel distance had not exceeded 20,000 km till the end of tire life was reached, while the lane changeability was excellent (or not excellent).

As a result, it turned out that pneumatic tires according to embodiment examples 2-1 to 2-5, in which the outer carcass periphery length Ca1 was greater by 0.5 to 10 mm than the inner carcass periphery length Ca, had an enhanced lane changeability, and long tire life (with a suppressed degradation of abrasion resistance). In particular, it turned out that a pneumatic tire according to embodiment example 2-4, in which the outer carcass periphery length Ca1 was greater by 3 mm than the inner carcass periphery length Ca, had an enhanced lane changeability, and long tire life.

Industrial Applicability

As mentioned above, a pneumatic tire according to the invention has an enhanced traveling performance, in particular in lane changeability as well as in cornering performance, with a suppression of lopsided abrasion, and is useful in fabrication technology of pneumatic tire or the like.

The invention claimed is:

1. A pneumatic tire comprising: bead portions including an inner bead core located on an inner side when vehicle-mounted and an outer bead core located on an outer side when vehicle-mounted; at least a carcass layer and a tread portion disposed in a direction from a tire-radially inner side to a tire-radially outer side; and a belt layer provided in a tire-radial direction of the carcass layer, wherein in a section in a tire-width direction, assuming as a reference a tire centerline making right angles with a bead line interconnecting a center of the inner bead core and a center of the outer bead core, and passing a center of the bead line, an outer ground-contact area as a ground contact area between a road surface and the tread portion to be outside when vehicle-mounted is wider by 5 to 15% than an inner ground-contact area as a ground contact area between a road surface and the tread portion to be inside when vehicle-mounted, and wherein in the section in the tire-width direction, an outer carcass periphery length as a distance along a carcass centerline passing a center of the carcass layer, from a crossing point where the carcass centerline and the tire centerline cross, to a point where an inner end of the outer bead core is approached closest, is longer by 0.5 mm to 10 mm than an inner carcass periphery length as a distance along the carcass centerline from the crossing point to a point where an inner end of the inner bead core is approached closest, the pneumatic tire further comprising a side wall portion provided on an outer side in the tire-width direction of the carcass layer, wherein in the section in the tire width-direction, the outer carcass periphery length has in comparison with the inner carcass periphery length an elongate part located at an inner side in the tire-width direction of the side wall portion, the elongate part measured from a line perpendicular to the carcass centerline and tangent to an axially outer edge of a radially inner-most belt layer to a line perpendicular to the carcass centerline and tangent to an edge of a turnup portion of the carcass layer turned up from axially inside to axially outside around the outer bead core.

2. The pneumatic tire as claimed in claim 1, wherein a plurality of blocks are formed by a plurality of grooves in a tread face of the tread portion, and an outer negative ratio as a proportion of area of grooves to the tread face of the tread portion at the outer side when vehicle-mounted relative to the tire centerline is lower by 5 to 15% than an inner negative ratio as a proportion of area of grooves to the tread face of the tread portion at the inner side when vehicle-mounted relative to the tire centerline.

3. A pneumatic tire comprising: bead portions including an inner bead core located on an inner side when vehicle-mounted and an outer bead core located on an outer side when vehicle-mounted; and at least a carcass layer and a tread portion disposed in a direction from a tire-radially inner side to a tire-radially outer side; and a belt layer provided in a tire-radial direction of the carcass layer, wherein in a section in a tire-width direction, assuming as a reference a tire centerline making right angles with a bead line interconnecting a center of the inner bead core and a center of the outer bead core, and passing a center of the bead line, an outer ground-contact area as a ground contact area between a road surface and the tread portion to be outside when vehicle-mounted is wider by 5 to 15% than an inner ground-contact area as a ground contact area between a road surface and the tread portion to be inside when vehicle-mounted, and wherein in the section in the tire-width direction, an outer carcass periphery length as a distance along a carcass centerline passing a center of the carcass layer, from a crossing point where the carcass centerline and the tire centerline cross, to a point where an inner end of the outer bead core is approached closest, is longer by 2 mm to 10 mm than an inner carcass periphery length as a distance along the carcass centerline from the crossing point to a point where an inner end of the inner bead core is approached closest, the pneumatic tire further comprising a side wall portion provided on an outer side in the tire-width direction of the carcass layer, wherein in the section in the tire width-direction, the outer carcass periphery length has in comparison with the inner carcass periphery length an elongate part located at an inner side in the tire-width direction of the side wall portion, wherein in the section in the tire width-direction, the outer carcass periphery length has in comparison with the inner carcass periphery length an elongate part located at an inner side in the tire-radial direction of the belt layer, the elongate part measured from the crossing point where the carcass centerline and the tire centerline cross to the line perpendicular to the carcass centerline and tangent to an axially outer edge of a radially innermost belt layer.

* * * * *